No. 610,971. Patented Sept. 20, 1898.
N. M. POWELL.
PHOTOGRAPHIC REGISTER FOR RAILWAY COACHES.
(Application filed July 12, 1897.)
(No Model.) 2 Sheets—Sheet 1.
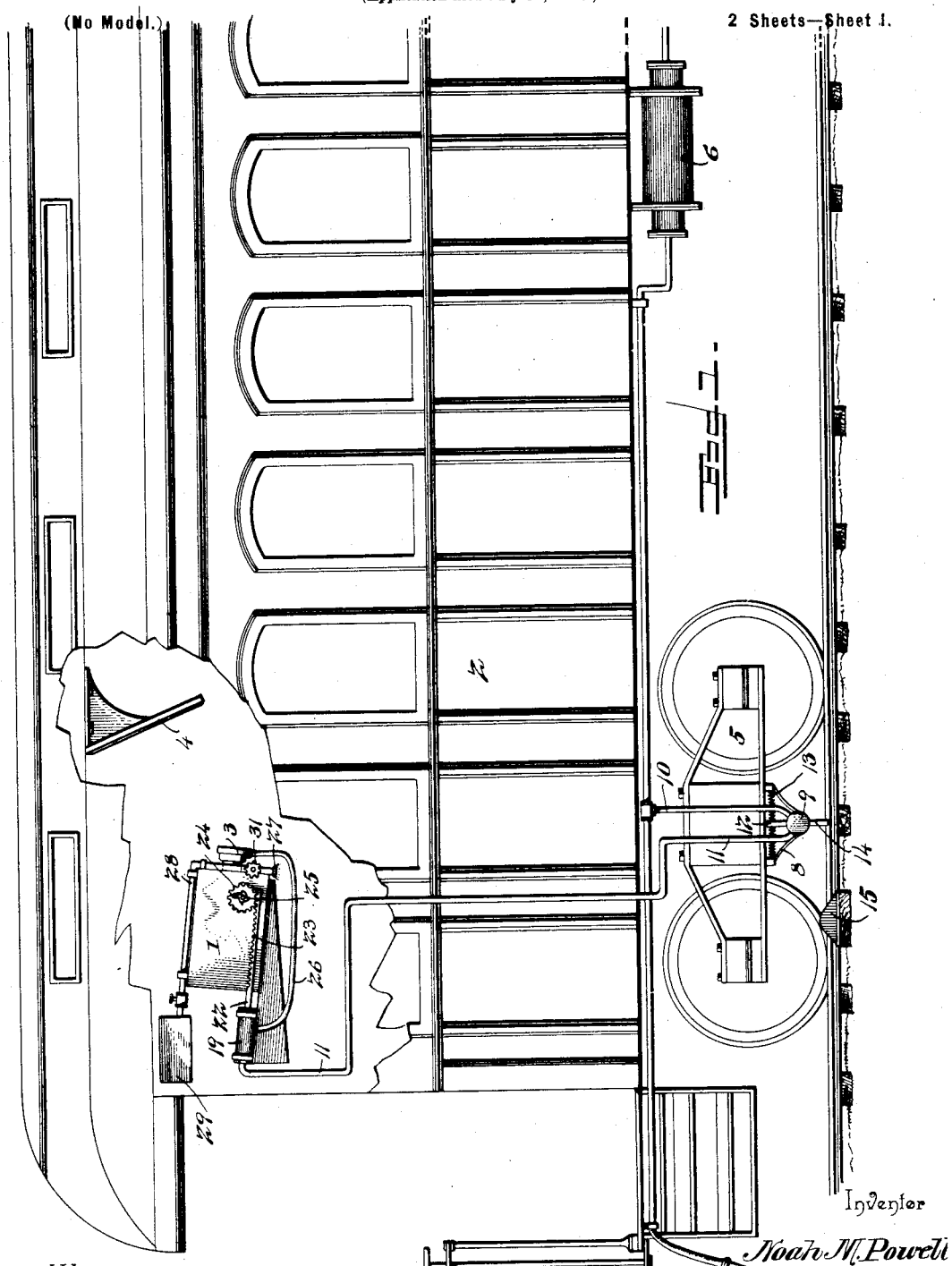
Witnesses
Inventor
Noah M. Powell
By his Attorneys, No. 610,971. Patented Sept. 20, 1898.
N. M. POWELL.
PHOTOGRAPHIC REGISTER FOR RAILWAY COACHES.
(Application filed July 12, 1897.)
(No Model.) 2 Sheets—Sheet 2.
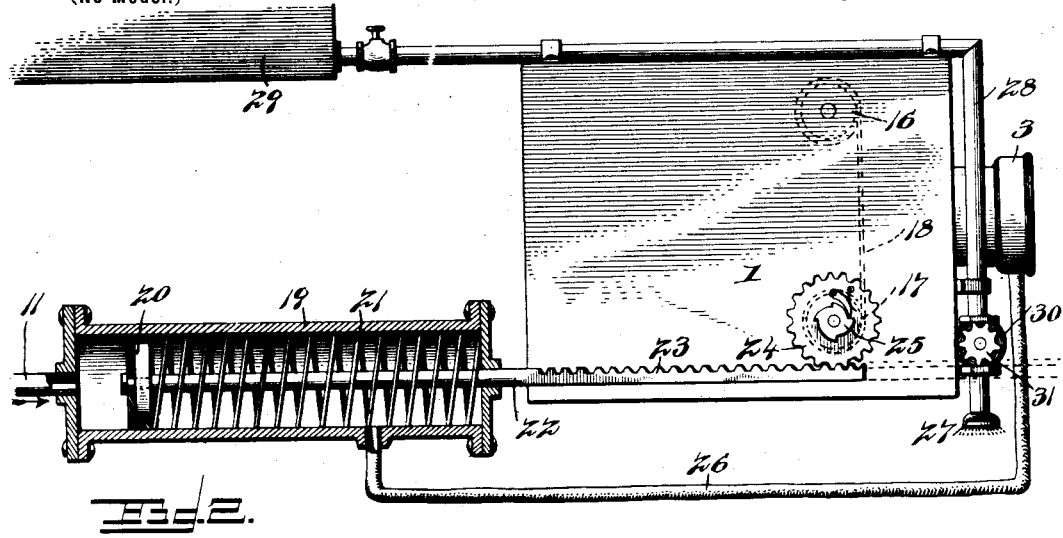
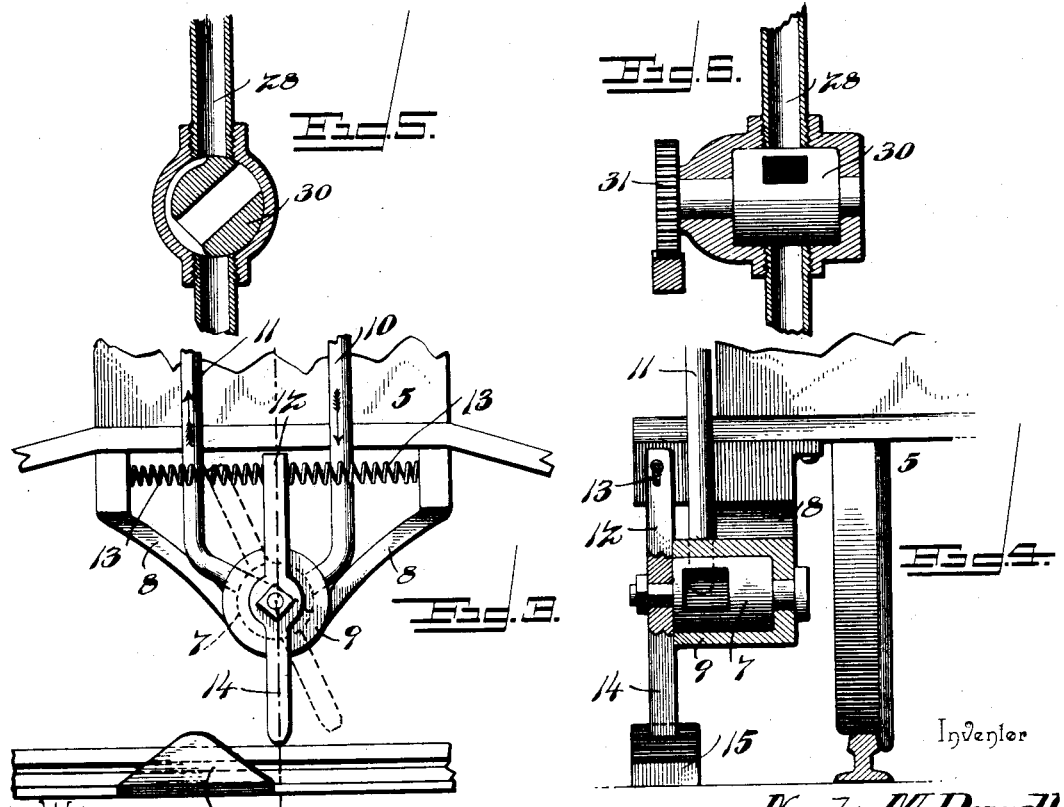
Witnesses
Inventor
Noah M. Powell

UNITED STATES PATENT OFFICE.

NOAH MONROE POWELL, OF KNOX CITY, MISSOURI, ASSIGNOR OF TWO-THIRDS TO FRED B. PARSONS AND ORVILLE D. JONES, OF SAME PLACE.

PHOTOGRAPHIC REGISTER FOR RAILWAY-COACHES.

SPECIFICATION forming part of Letters Patent No. 610,971, dated September 20, 1898.

Application filed July 12, 1897. Serial No. 644,328. (No model.)

*To all whom it may concern:*

Be it known that I, NOAH MONROE POWELL, a citizen of the United States, residing at Knox City, in the county of Knox and State of Missouri, have invented a new and useful Photographic Register for Railway-Coaches, of which the following is a specification.

My invention relates to improvements in photographic registers for railway coaches and cabooses; and the object of the invention is to provide mechanism by which the number of passengers in a coach or caboose may be determined or ascertained automatically by the aid of photography, to enable the print obtained by the apparatus to be compared with the returns of the conductor, and thereby ascertain whether the conductor is making true and correct returns to the auditor of the railway.

A further object of my invention is to provide controlling mechanism for the photographic camera which will be operated automatically as the coach travels from one station to the other, to effect the operation of the camera for the purpose of taking a picture of the interior of the coach and the occupants thereof, this controlling mechanism of my newly-invented system being so arranged that it cannot be tampered with by the conductor or other employees of the railway company traveling on the train.

A further object of the invention is to provide means whereby flash-light pictures of the interior of a railway coach or caboose may be obtained during night runs of the trains, such flash-light appliances being controlled automatically with the remainder of the photographic appliances.

To the accomplishment of these ends the first part of my invention consists in the combination, with a camera arranged within the interior of a coach or caboose in position to take in the whole field within the coach, as well as all the passengers therein, of a mechanism for controlling the camera-shutter, in which an automatic valve is employed beneath the body of the coach, connections between said automatic valve and the camera-shutter, and with the air-brake appliances on said coach and tappet mechanism associated with said automatic valve to open and close the latter at suitable intervals for the purpose of admitting the motive fluid, such as compressed air, to the shutter mechanism of the camera.

The invention further consists in the combinations of devices and in the novel construction and arrangement of parts, which will be hereinafter fully described and claimed.

To enable others to understand my invention, I have illustrated the preferred embodiment thereof in the accompanying drawings, forming a part of this specification, and in which—

Figure 1 is a view of part of an ordinary railway-coach with my photographic register system applied thereto. Fig. 2 is a sectional elevation of part of the camera, showing the mechanism employed in the present instance for controlling the admission of the motive fluid, such as compressed air, to operate the shutter mechanism, the flash-light appliances, and for adjusting the roll-film. Fig. 3 is an enlarged detail view, in side elevation, of the automatic valve and the tappet devices. Fig. 4 is a sectional elevation at right angles to Fig. 3, showing a part of a railway-car with the automatic valve in section and the tappet devices in elevation. Figs. 5 and 6 are detail views of one form of valve mechanism for controlling a flash-light device in which acetylene gas may be used as the medium for giving the flash-light adjacent to the camera-lens.

Like numerals of reference indicate like parts in all the figures of the drawings, referring to which—

1 indicates the camera, which is mounted in an overhead position within an ordinary railway coach or caboose, (indicated at 2.) The camera may be of any preferred or suitable construction, and it is provided with the usual lens-tube and with a shutter mechanism. The lens-tube of the camera is indicated at 3, and the camera or its lens-tube carries the shutter mechanism. The shutter mechanism which I prefer to employ is the usual self-setting pneumatic mechanism familiar to those skilled in the art of photography, and I have therefore not deemed it necessary to illustrate the same in this application.

The camera 1 is supported by any suitable means within a car in an overhead position therein and preferably at one end of the same. This camera is arranged, preferably, in an inclined position to make its field the whole interior of the car in order to take a picture of all the passengers of the car. In connection with the camera I may employ a mirror 4, which is suspended from the top of the car in front of the camera. The mirror is arranged in an inclined position to face toward that end of the car at which the camera is situated, and the camera is thus made to take in the mirror and its reflection, to include in the picture the occupants of the end seats of the car. The mirror 4 may be of any suitable construction, and it is supported or suspended in any suitable manner within the car.

The car has the usual trucks, (indicated in a conventional way at 5,) and as usual it is equipped with the air-brake appliances, the cylinder of which is indicated at 6.

My automatic valve 7 is arranged beneath the body of the coach or car 2, and in the drawings I have shown this valve 7 carried on the car-truck 5 in any suitable way, although this position of the valve on the truck is not material, because the valve may be placed at any other convenient point on the car. Any suitable devices for supporting the valve may be employed, but in Figs. 3 and 4 I have shown this valve carried by a bracket or hanger 8, attached to the truck-frame.

To the valve-casing 9 is connected one end of an air-pipe 10, which is led along the car to connect with the brake-cylinder 6 or with any other suitable part of the air-brake mechanism. The valve proper is preferably of the type known as "turning-plug" valves, and it is seated in its casing tightly to prevent leakage of the air through the valve 7, the latter being normally in free communication with the air-brake by means of the pipe 10. From the valve-casing 9, at a point opposite to the connection of the pipe 10 with said valve-casing, leads a pipe 11, which is connected with the operative mechanism of the camera 1. The valve 7 is equipped with means which tend to hold the valve normally in a closed condition to prevent the air from the brake mechanism from passing to the camera-operating devices. This means for keeping the valve closed normally is shown in the drawings as consisting of a rocking arm 12, suitably attached to the valve and operatively connected with holding-springs 13, supported in the valve-hanger 8. As shown, two springs are employed to bear against opposite sides of the valve-arm 12, as shown by Fig. 3, said springs exerting equal pressure on the valve-arm to hold the same in equilibrium, but capable of yielding or giving to the motion of said valve-arm when the valve is operated by its tappet devices.

The tappet mechanism consists of an arm 14 and a series of tappets placed at suitable intervals along the railway-track between the stations of the railway. One of these tappets is shown at 15 in Figs. 1, 2, and 3 of the drawings as consisting of a block with inclined faces for the tappet-arm 14 to ride against as the train passes over the track; but the form and construction of the tappet devices may be modified or changed without departing from the spirit of my invention. The tappet-arm 14 is attached or connected with the valve 7 to operate the latter when the tappet-arm is raised by engaging with the fixed tappet 15. If desired, this tappet-arm may carry a friction-roller at its end to ride upon the tappet; but as such modification is obvious and readily supplied by a skilled mechanic I have not deemed it necessary to illustrate the same in the drawings. The tappet-arm normally depends from the valve, so as to ride upon the tappet 15, which is fastened or spiked to the ties of a track to lie in the path of the tappet-arm. The tappet is provided at any suitable point between the stations, and the appliance is thus adapted for automatic operation to take pictures of the interior of a car while traveling between the stations independent of the conductor of the train or other employees of the railway and even without their knowledge.

The air-pipe 11 leads to the camera-operating mechanism shown by Fig. 1 and illustrated more clearly by Fig. 2 of the drawings. I prefer to employ a camera in which a film-roll is made as a part of the camera, and in Fig. 2 the film-spools are indicated at 16 17 and the film itself is shown by dotted lines at 18 as passing across and in rear of the lens-tube. The film is adapted to be uncoiled from the roll or spool 16 and to be wound on the spool 17, and with this last-named spool 17 is associated the camera-operating devices. Adjacent to the camera is mounted a pressure-cylinder 19, to one end or head of which is coupled the air-pipe 11. Within this pressure-cylinder is arranged a piston 20 and a pressure-spring 21, and the piston-rod 22 is extended through the cylinder and carried alongside of the camera 1, as shown. The piston-rod 22 has on its prolonged end a series of teeth, constituting a rack 23, which I have combined with a ratchet-controlled spur gear-wheel 24, the pawl-and-ratchet mechanism of which is indicated at 25, said rack-formed piston-rod 23 being also adapted to operate the flash-light appliances of the photographic outfit supplied to a car. The spur gear-wheel 24 is attached to a protruding end of the shaft or trunnion of the film-spool 17, and the ratchet-and-pawl device 25 of this gear-pinion is arranged on the outstroke of the piston-rod 23 to prevent the spur gear-wheel from turning the spool 17; but on the back stroke of the piston-rod and its rack this ratchet device operates to make the gear-pinion 24 fast with the shaft of the spool 17 to rotate the latter to wind the film thereon, and thus move the film to expose a new surface of the same for taking the next latent impression. With the pressure-cylinder 19 is connected a branch pipe 26, which leads to and is coupled with the operating devices of the pneumatic self-setting shutter of the camera. This branch pipe 26 is connected to the pressure-cylinder 19 at a point intermediate of the length of said cylinder or near one end thereof; but air is normally prevented from entering this branch pipe 26 because the piston-head fits tight in the cylinder, and the pressure-spring 21 holds the piston at a point in the cylinder where the piston-head cuts off the passage of air from the pipe 11 to the pipe 26 through the pressure-cylinder. When the tappet-arm 14 strikes the tappet 15, it opens the valve against the tension of the closing-springs 13 to permit air to pass from the pipe 10 through the valve 7 into the pipe 11, and this last-named pipe 11 conducts the air under pressure to the cylinder 19, the air moving the piston and the rack-formed rod outward against the tension of the spring 21. When the piston moves in the pressure-cylinder past the port from the pipe 26, the air passes into the pipe 26 and operates the pneumatic shutter to open the lens-tube momentarily and then close the camera, the shutter being self-setting, whereby a latent impression may be obtained on the sensitized film 18 in the camera. On the outstroke of the piston-rod the ratchet devices 25 prevent the rack-formed rod from adjusting or influencing the gear 24 to change the position of the film 18; but after the impression has been obtained by exposing the film by the opening of the shutter and after the force of the impulse of the air admitted by the valve 7 has expended itself the spring 21 returns the piston and rod to their normal positions. During the back stroke of the piston-rod the rack thereof operates the spool 17, through the gear 24, to wind the film on said spool 17, and thereby a new surface of the film is moved into position to receive the new latent impression on the subsequent operation of the shutter.

In connection with my automatic system of obtaining a register of the number of passengers in a railway-car while traveling between the stations I have designed to use a flash-light mechanism for service during the night runs of the train. This flash-light mechanism may be of any suitable character, in which magnesium powder or other chemicals may be used; but in the accompanying drawings I have shown the flash-light appliances of a character to utilize the bright light obtained from acetylene gas, although any other kind of gas or light may be employed. In the flash-light devices shown in the drawings I employ a burner (indicated at 27) by which a small light is kept constantly burning at the night time. This burner 27 is carried by a pipe 28, arranged adjacent to the lens of the camera, and this pipe leads to a suitable storage-tank (indicated at 29) from whence the supply of gas is obtained. In this gas-feed pipe 28 to the burner 27 is situated a valve 30, adapted for operation automatically by the piston-rod rack 23 of the camera-operating devices. In Figs. 5 and 6 I have shown this valve 30 of a construction to insure a limited supply of gas to the burner 27 and as provided with a gear-pinion 31, which is arranged in the path of the rack 23 on the piston-rod. When air is admitted to the cylinder 19 and the plunger-rod and rack are forced outward, the rack engages with the pinion 31 to open the valve 30 quickly and admit a relatively large volume of gas to the burner to produce the flash-light before or simultaneously with the operation of the camera-shutter; but as the piston-rod is drawn backward into the pressure-cylinder by the action of the spring 21 the piston-rod rack again operates the pinion 31 to partially close the valve 30, suitable stop devices being employed or the gear of the rack and the pinion 31 being so proportioned as to arrest the closing movement of the valve 30 in a manner to permit the valve to feed a small quantity of gas to the burner 27 to maintain a low or small light.

It is thought that the operation and the advantages of my invention will be readily understood and appreciated by those skilled in the art from the foregoing description, taken in connection with the drawings.

I am aware that changes in the form and proportion of parts and in the details of construction of the devices herein shown and described as the preferred embodiment of my invention may be made by a skilled mechanic without departing from the spirit or sacrificing the advantages of my invention. I therefore reserve the right to make such modifications and alterations as fairly fall within the scope of my invention.

Having thus fully described my invention, what I claim as new, and desire to secure by Letters Patent, is—

1. In a photographic register for railway-cars, the combination of a camera, an automatic valve having connections with a source of fluid-supply, shutter-controlling devices connected with automatic valve, and tappet devices by which the valve may be operated at suitable intervals to admit the motive fluid to the camera-controlling devices, as and for the purposes described.

2. In a photographic register for railway-cars, the combination with a camera, shutter-controlling mechanism therefor, a valve connected with a source of fluid-supply and with said shutter-controlling mechanism, tappet devices for operating the valve, and a flash-light mechanism operated in synchronism with said shutter mechanism, as and for the purposes described.

3. In a photographic register for cars, the combination with a camera, of a pressure-cylinder having a piston, a pipe connected with said pressure-cylinder and with the shutter devices of the camera, and a feed mechanism operated by the piston-rod to regulate and control the sensitized film of said camera, as and for the purposes described.

4. In a photographic register for cars, the combination with a camera, of a pressure-cylinder having a piston and a rack on the rod thereof, a pipe connecting the pressure-cylinder with the camera-shutter, and a pawl-and-ratchet-controlled gear arranged to engage with the rack on the piston-rod and operatively connected with one of the film-spools of the camera, as and for the purposes described.

5. In a photographic register for railway-cars, the combination with a camera, of a pressure-cylinder, a spring-controlled piston therein having a rack-formed piston-rod, a feed mechanism for the sensitized film of the camera, and a flash-light appliance with a controlling-valve having a pinion in the path of said rack of the piston, as and for the purposes described.

6. In a photographic register for railway-cars, the combination with a camera, of a pressure-cylinder having a piston and a protruding rod, a pipe connecting the cylinder with the shutter mechanism of the camera, and a flash-light appliance arranged in the path of said piston-rod to be operated thereby, as and for the purposes described.

7. In a photographic register for railway-cars, the combination with a camera, of a pressure-cylinder having a piston and a protruding, rack-formed rod, a pipe connecting said cylinder with the shutter mechanism of the camera, a ratchet-and-pawl-controlled gear on one of the film-spools of the camera and lying in the path of said rack on the piston-rod, a flash-light burner, and a regulating-valve for said burner arranged in the path of the piston-rod to be operated thereby, as and for the purposes described.

8. In a photographic register for railway-cars, the combination with a camera, and shutter-operating mechanism therefor, of an automatic valve connected with a source of fluid-supply and with said shutter-operating mechanism, a tappet, and a tappet-arm connected with the valve and arranged to strike the tappet and open the valve, as and for the purposes described.

9. In a photographic register for railway-cars, the combination with a camera, and a shutter-operating mechanism therefor, of an automatic valve having an arm controlled by a spring, or springs, to hold the valve normally in a closed position, tappet devices associated with said valve to open the same at suitable intervals, and pipes connecting the valve with a source of fluid-supply and with the shutter-operating mechanism, as and for the purposes described.

10. In a photographic register for railway-cars, a camera sustained in an overhead position to have as its field the interior of a car, combined with mechanism, substantially such as described, whereby the camera may be operated at intervals to expose a part of the sensitized surface therein for the purposes described, substantially as set forth.

11. The combination with a source of fluid-supply, of an automatic controlling-valve, a pressure-cylinder having an exit-port, a pipe leading from said exit-port, a plunger fitted in said cylinder to travel past the exit-port therein, a pipe connecting the pressure-cylinder and the automatic valve to convey fluid from the latter to the pressure-cylinder, and tappet mechanism operatively connected with said automatic valve to open the latter and permit fluid under pressure to pass to the cylinder, whereby the pressure-fluid moves the plunger beyond the exit-port and escapes into the pipe leading therefrom, substantially as described.

In testimony that I claim the foregoing as my own I have hereto affixed my signature in the presence of two witnesses.

NOAH MONROE POWELL.

Witnesses:
O. D. JONES,
JOSEPH M. HARDMAN.